April 6, 1926.

L. MERRIMAN

STRAINER

Filed August 3, 1925

1,580,065

Leroy Merriman
INVENTOR

BY Victor J. Evans
ATTORNEY

WITNESS

Patented Apr. 6, 1926.

1,580,065

UNITED STATES PATENT OFFICE.

LEROY MERRIMAN, OF CASPER, WYOMING.

STRAINER.

Application filed August 3, 1925. Serial No. 47,904.

*To all whom it may concern:*

Be it known that I, LEROY MERRIMAN, a citizen of the United States, residing at Casper, in the county of Natrona and State of Wyoming, have invented new and useful Improvements in Strainers, of which the following is a specification.

This invention contemplates the provision of a strainer adapted to be used in a pipe line, to strain the fluid which passes through the line, and embodies a strainer element which is capable of being easily and conveniently operated from the pipe line when it is desired to remove the dirt or other foreign matter therefrom.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
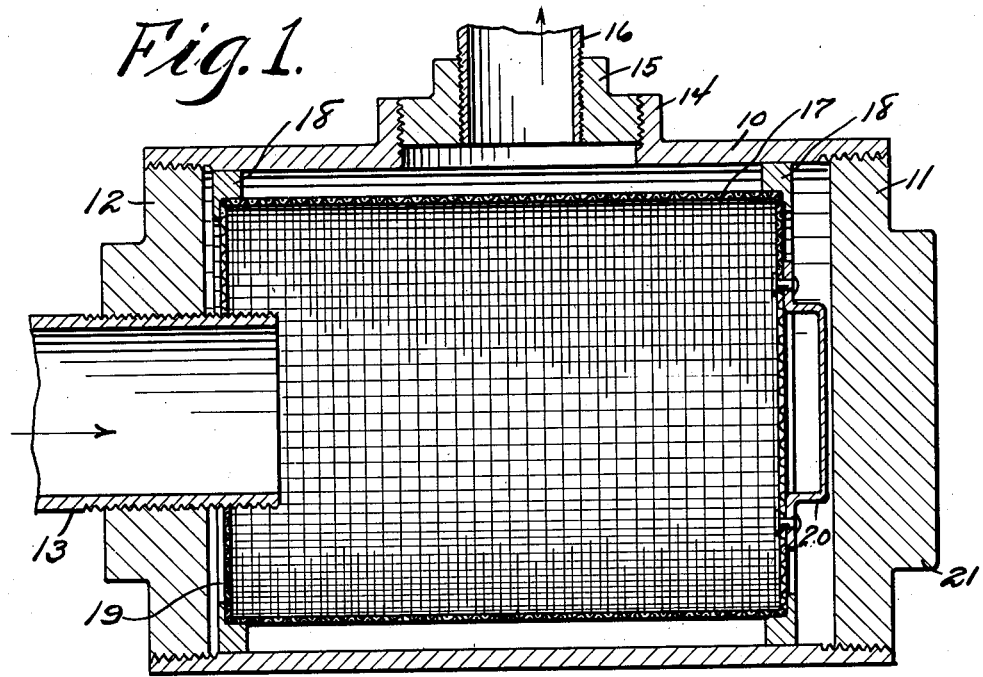
Figure 1 is a sectional view taken on line 1—1 of Figure 2.
Figure 2:
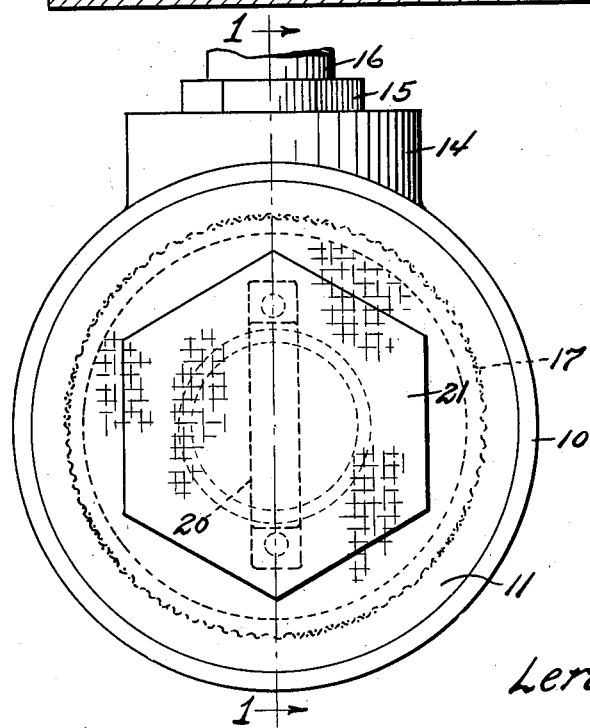
Figure 2 is an end elevation.

The device forming the subject matter of the present invention comprises a casing 10 which may vary in size and configuration without departing from the spirit of the invention, being preferably of cylindrical contour in cross section as shown. This casing is closed at its opposite ends by removable plates 11 and 12 respectively which plates are preferably threaded into the casing as shown in Figure 1. The plate 12 is provided with an enlarged central opening into which is threaded the pipe 13 through which a fluid to be strained enters the device. Projecting from the casing 10 is a hollow boss 14 into which is threaded a bushing 15, the bushing being internally threaded to accommodate the adjacent end of the pipe 16 which constitutes the outlet for the fluid from the device. The pipe 16 is arranged at a right angle to the pipe 13, it of course being understood that the device forming the subject matter of the invention is adapted to be coupled or arranged in the length of the pipe line for the purpose above stated.

Arranged within the casing 10 is a strainer consisting of a cylindrical body portion 17 of any suitable foraminated material, this body portion being spaced from the walls of the casing 10 by means of disks 18 which are designed to surround the strainer 17 at the ends thereof. A ring 18 arranged adjacent the pipe 13 is formed with a large central opening 19 as is also the adjacent end of the strainer 17, so that the pipe 13 projects through these openings an appreciable distance within the strainer, so that all of the fluid passing from the pipe 13 is conveyed into the strainer. The other ring 18 has associated therewith a handle 20, the handle being arranged an appreciable distance inwardly from the adjacent end of the casing 10, so that after the strainer has been positioned within the casing the plate 11 can be associated with the casing as shown in Figure 1. This plate is formed with a centrally disposed projecting portion 21 which may be of any desired angular contour to permit the use of a wrench or other suitable tool for associating the plate with the casing or removing it therefrom as the occasion may require.

In practice, the fluid passing through the pipe line enters the strainer 17 from the pipe 13 which strainer of course separates the dirt and other foreign matter from the fluid prior to its escape therefrom through the outlet pipe 16. It is manifest that the strainer can be conveniently and quickly removed from the casing 10 in order to clean the strainer or the interior of the casing by simply removing the plate 11 and sliding the strainer endwise through the casing 10.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A device of the character described, comprising a cylindrical casing open at both ends, and provided with a lateral outlet intermediate its ends, and interiorly threaded adjacent said ends, discs threaded into said casing and closing said ends, one of said discs having an enlarged central opening interiorly threaded, a removable strainer of cylindrical contour and closed ends arranged within the casing and having an enlarged central opening in one end thereof, registering with the opening in the adjacent disc adapted to receive an inlet pipe, rings of substantially L-shaped formation in cross section at the opposed ends of said strainer and employed to space the latter from the walls of said casing, the L-shaped portion fitting against the end wall and peripheral wall of the strainer, and a handle carried by one end of said strainer.

In testimony whereof I affix my signature.

LEROY MERRIMAN.